United States Patent
Lee

(10) Patent No.: US 12,330,810 B2
(45) Date of Patent: Jun. 17, 2025

(54) SYSTEM AND APPARATUS FOR DETECTING RESTRAINED UNIT LOAD DEVICE USING FLOOR LATCH SENSOR

(71) Applicant: Carrier Corporation, Palm Beach Gardens, FL (US)

(72) Inventor: Shaw Ping Lee, Singapore (SG)

(73) Assignee: Carrier Corporation, Palm Beach Gardens, FL (US)

( * ) Notice: Subject to any disclaimer, the term of this patent is extended or adjusted under 35 U.S.C. 154(b) by 787 days.

(21) Appl. No.: 17/678,108

(22) Filed: Feb. 23, 2022

(65) Prior Publication Data

US 2022/0289384 A1   Sep. 15, 2022

Related U.S. Application Data

(60) Provisional application No. 63/158,494, filed on Mar. 9, 2021.

(51) Int. Cl.
*G08B 21/00* (2006.01)
*B64D 9/00* (2006.01)
*B65D 88/14* (2006.01)
*E05B 81/66* (2014.01)

(52) U.S. Cl.
CPC ............ *B64D 9/003* (2013.01); *B65D 88/14* (2013.01); *E05B 81/66* (2013.01)

(58) Field of Classification Search
CPC .......... B64D 9/003; B65D 88/14; E05B 81/66
See application file for complete search history.

(56) References Cited

U.S. PATENT DOCUMENTS

| | | | | |
|---|---|---|---|---|
| 3,796,397 A | * | 3/1974 | Alberti | B64D 9/003 410/79 |
| 4,989,809 A | * | 2/1991 | Arnold | B64C 1/18 244/137.1 |
| 5,090,639 A | * | 2/1992 | Miller | B64D 9/00 244/137.1 |
| 5,127,789 A | * | 7/1992 | McLellan | B65G 67/20 414/512 |
| 5,564,654 A | * | 10/1996 | Nordstrom | B64D 9/003 248/500 |
| 5,871,317 A | * | 2/1999 | Huber | B64D 9/003 410/94 |
| 5,957,406 A | * | 9/1999 | Nelson | B64D 9/00 410/86 |
| 6,454,210 B1 | * | 9/2002 | Plattner | B64C 1/1415 244/129.5 |
| 11,794,629 B1 | * | 10/2023 | Gill | B60P 7/0861 |
| 2002/0017989 A1 | * | 2/2002 | Forster | G01S 5/0018 340/945 |
| 2004/0216982 A1 | * | 11/2004 | Huber | B64C 1/20 193/35 MD |

(Continued)

*Primary Examiner* — Quang Pham
(74) *Attorney, Agent, or Firm* — Carlson, Gaskey & Olds, P.C.

(57) ABSTRACT

A unit load device (ULD) for aircraft cargo loading, the ULD including a container having a cargo portion and a ledge extending from the cargo portion. The ledge is configured to interface with a floor latch. A first latch sensor is disposed on the ledge. The first latch sensor is configured to detect a closed latch contact. A controller is electrically connected to the first sensor, and is configured to automatically perform an action in response to the first latch sensor detecting the closed latch contact.

19 Claims, 4 Drawing Sheets

(56) References Cited

U.S. PATENT DOCUMENTS

| | | | | |
|---|---|---|---|---|
| 2005/0072880 A1* | 4/2005 | Nolan | ................ | B64D 1/16 244/136 |
| 2005/0095087 A1* | 5/2005 | Sullivan | ............ | H01L 21/67736 414/217 |
| 2008/0185489 A1* | 8/2008 | Ehrgott | ................ | A47B 96/067 248/224.7 |
| 2008/0309487 A1* | 12/2008 | Chao | ................ | G08B 13/06 340/542 |
| 2011/0017693 A1* | 1/2011 | Thomas | ................ | G06Q 10/08 212/270 |
| 2011/0181391 A1* | 7/2011 | Chu | ................ | G06Q 10/08 340/8.1 |
| 2011/0313564 A1* | 12/2011 | Schnorwangen | ........ | B64D 9/00 700/214 |
| 2012/0161958 A1* | 6/2012 | Turon | ................ | G01S 19/34 340/539.3 |
| 2012/0188104 A1* | 7/2012 | Choi | ................ | G06Q 10/083 340/989 |
| 2012/0261981 A1* | 10/2012 | Paul | ................ | B64D 11/0624 307/9.1 |
| 2012/0262307 A1* | 10/2012 | Poon | ................ | G06Q 10/08 340/984 |
| 2013/0136556 A1* | 5/2013 | Bose | ................ | B60P 7/15 410/32 |
| 2013/0256047 A1* | 10/2013 | Grossman | ............... | B60P 3/062 180/198 |
| 2014/0367515 A1* | 12/2014 | Lohmann | ............... | B60P 7/0892 244/118.1 |
| 2014/0367545 A1* | 12/2014 | Fenton | ............... | B60N 2/01508 248/503.1 |
| 2016/0095290 A1* | 4/2016 | Reginhard | ............ | A01K 1/0245 119/496 |
| 2018/0015882 A1* | 1/2018 | Kim | ................ | B60R 7/02 |
| 2018/0194468 A1* | 7/2018 | Brown | ................ | B64D 9/00 |
| 2019/0161191 A1* | 5/2019 | Köhler | ................ | B64C 1/20 |
| 2019/0322369 A1* | 10/2019 | Weisfelner | ............. | G08B 5/223 |
| 2021/0341333 A1* | 11/2021 | Osborn | ................ | B64U 20/87 |
| 2022/0063807 A1* | 3/2022 | Ferrell | ................ | B64F 1/322 |
| 2022/0289384 A1* | 9/2022 | Lee | ................ | B64D 9/003 |

* cited by examiner

SYSTEM AND APPARATUS FOR DETECTING RESTRAINED UNIT LOAD DEVICE USING FLOOR LATCH SENSOR

CROSS-REFERENCE TO RELATED APPLICATION

This application claims priority to U.S. Provisional Patent Application No. 63/158,494 filed on Mar. 9, 2021.

TECHNICAL FIELD

The present disclosure relates generally to unit load devices (ULDs) for aircraft loading, and more specifically to a floor latch sensor for detecting when a ULD is loaded in an aircraft.

BACKGROUND

Cargo transportation in certain aircraft includes the utilization of specialized cargo containers referred to as unit load devices (ULDs). In order to properly secure the ULD, many aircraft use a floor latch system that prevents shifting or moving of the ULD during aircraft operations floor latch (i.e., restrained). For tracking purposes, it is desirable to know when a ULD is loaded into an aircraft. In addition to tracking cargo and ULD loading, certain ULDs, such as environmentally controlled ULDs or ULDs including telematics devices, or other types of ULDs including actively operating systems, may have specific actions that should be performed or restricted once the ULD is loaded. In cases where the active ULD operations could affect aircraft functions, human error can cause the ULD to incorrectly remain operating, or operate in an incorrect mode, throughout a flight.

SUMMARY OF THE INVENTION

In one exemplary embodiment a unit load device (ULD) for aircraft cargo loading, the ULD includes a container having a cargo portion and a ledge extending from the cargo portion, the ledge being configured to interface with a floor latch, a first latch sensor disposed on the ledge, wherein the first latch sensor is configured to detect a closed latch contact, and a controller electrically connected to the first sensor, the controller being configured to automatically perform an action in response to the first latch sensor detecting the closed latch contact.

In another example of the above described ULD for aircraft cargo loading the ledge comprises an upward facing surface and an outward facing surface, the outward facing surface being perpendicular to the upward facing surface, the first latch sensor being disposed on at least one of the upward facing surface and the outward facing surface.

Another example of any of the above described ULDs for aircraft cargo loading further includes a second latch sensor disposed on at least one of the upward facing surface and the outward facing surface, the second latch sensor configured to detect the closed latch contact.

In another example of any of the above referenced ULDs for aircraft cargo loading the first latch sensor is disposed on the upward facing surface and the second latch sensor is disposed on the outward facing surface.

In another example of any of the above referenced ULDs for aircraft cargo loading the first latch sensor and the second latch sensor are disposed on the upward facing surface.

In another example of any of the above referenced ULDs for aircraft cargo loading the second latch sensor is substantially identical to the first sensor.

In another example of any of the above referenced ULDs for aircraft cargo loading the first latch sensor comprises a pressure sensor, the pressure sensor indicating a closed latch contact when pressure on the pressure sensor exceeds a threshold pressure value.

In another example of any of the above referenced ULDs for aircraft cargo loading the first latch sensor comprises at least one light sensor.

In another example of any of the above referenced ULDs for aircraft cargo loading every light sensor of the at least one light sensor comprises at least one emitter and at least one receiver, the emitter configured to emit light toward the receiver, the light sensor indicating a closed latch contact when the receiver does not receive the light emitted by the emitter.

In another example of any of the above referenced ULDs for aircraft cargo loading the second latch sensor comprises at least one light sensor.

In another example of any of the above referenced ULDs for aircraft cargo loading each respective light sensor comprises at least one emitter and at least one receiver, the emitter configured to emit light toward the receiver, the light sensor indicating a closed latch contact when the receiver does not receive the light emitted by the emitter.

In another example of any of the above referenced ULDs for aircraft cargo loading the action in response to the first latch sensor detecting the closed latch contact is at least one of: disabling a telematics system, and altering a heating, ventilation, and cooling cycle of an active cooling system of the ULD.

An exemplary method for verifying a latched state of a unit load device (ULD) in an aircraft cargo hold, the method includes detecting a latching arm of a floor latch interfacing with a ledge of the ULD using at least one sensor disposed on the ledge, and a controller of the ULD responding to detecting of the latching arm interfacing with the ledge by at least one of: disabling a telematics system, and altering a heating, ventilation, and cooling cycle of an active cooling system of the ULD.

In another example of the above described method for verifying a latched state of a ULD in an aircraft cargo hold the sensor comprises at least one light sensor.

In another example of any of the above described methods for verifying a latched state of a ULD in an aircraft cargo hold every light sensor of the at least one light sensor comprises at least one emitter and at least one receiver, the emitter configured to emit light toward the receiver, the detecting of the latching arm interfacing with the ledge is completed by detecting that the receiver is not receiving the light emitted by the emitter.

In another example of any of the above described methods for verifying a latched state of a ULD in an aircraft cargo hold the sensor comprises a pressure sensor.

In another example of any of the above described methods for verifying a latched state of a ULD in an aircraft cargo hold the detecting of the latching arm interfacing with the ledge is detected when pressure on the pressure sensor exceeds a threshold pressure value, the pressure being generated at least in part by the latching arm.

In another example of any of the above described methods for verifying a latched state of a ULD in an aircraft cargo hold detecting the latching arm interfacing with the ledge is verified by a second sensor disposed on the ledge.

In another example of any of the above described methods for verifying a latched state of a ULD in an aircraft cargo hold the second sensor comprises at least one of a pressure sensor and a light sensor.

Another example of any of the above described methods for verifying a latched state of a ULD in an aircraft cargo hold further includes initiating a cargo tracking system of the ULD to communicate with a central cargo tracking system to update a tracking status of the ULD.

These and other features of the present invention can be best understood from the following specification and drawings, the following of which is a brief description.

DETAILED DESCRIPTION

Figure 1:
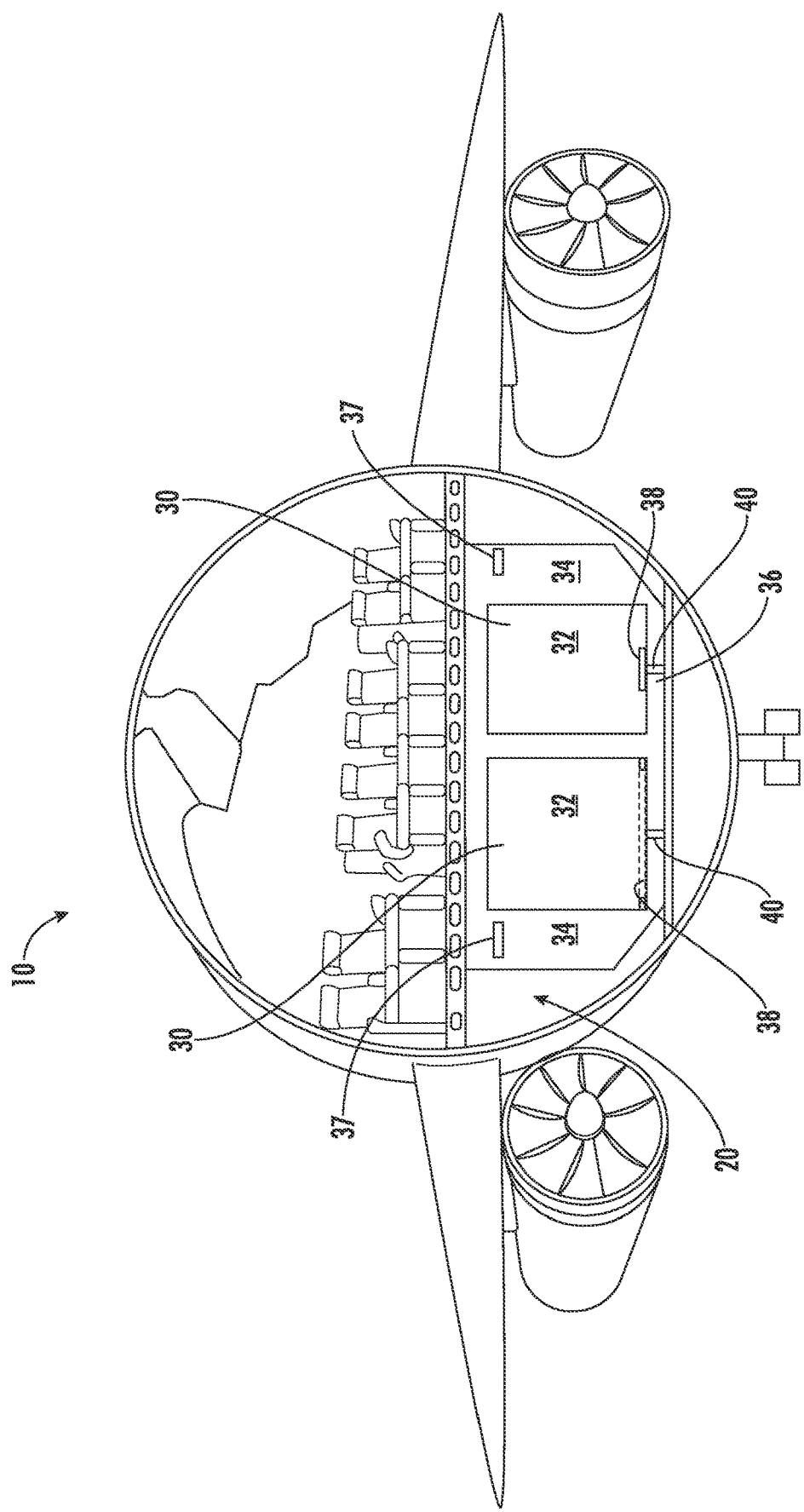
FIG. 1 illustrates a highly schematic cross-sectional view of an aircraft.

FIG. 1 schematically illustrates a cross sectional view of an aircraft 10 including a cargo hold 20. Contained within the cargo hold 20 are multiple unit load devices (ULDs) 30. The illustrated ULDs 30 include a cargo portion 32 and an active portion 34. The cargo portion 32 includes an open container area in which cargo can be stowed. The active portion 34, in one example, includes a refrigeration system having a compressor, fan, and other cooling systems. In alternative examples, the active portion 34 can be any climate control system, a telematics system for cargo tracking, or any other actively operating ULD system. As used herein, the active portion 34 refers to any portion of the ULD that performs a controlled operation. The illustrated physical arrangement of the ULDs 30, including the relative size, position, and orientation of the portions 32, 34 is purely exemplary in nature and alternative configurations of the portions 32, 34 fall within the present disclosure.

When loaded and in position, a floor latch 40 latches onto a corresponding ledge 36 (illustrated in greater detail in FIG. 2) and restrains the ULD 30 to prevent shifting or other movement of the ULD 30 during aircraft operations. Each of the ULDs 30 can be rotated 180 degrees and loaded on either side of the cargo hold 20 making the forward and aft ends of the ULD 30 interchangeable. To facilitate such installation, a ledge 36 is incorporated on both sides of the ULDs 30, and the floor latch 140 can connect to the ledge 36 extending from either side of the ULD 30. In alternative examples, a single ledge 36 extends all or a portion of the circumference of the base of the ULD 30 and operates in the same manner.

In some examples, it is desirable to disable or otherwise alter the operations of the active portion 34 of the ULD 30 once the ULD 30 is properly restrained in the aircraft 10. While existing systems rely on a human operator or technician to indicate that the ULD is going to be restrained, and to alter the operations of the active portion 34 of the ULD 30 prior the ULD 30 being loaded into the aircraft, such systems are subject to human error and may not alter the operations of the active portion 34. Further, in some cases, altering or stopping operations of the active portion 34 may be required by regulatory authorities or may improve aircraft operations.

In order to automate the altering of the active portion 34, each ULD 30 includes a controller 37 and one or more sensors 38 positioned on the ledge 36 of the ULD 30. The sensors 38 are connected to the controller 37, and provide a signal to the controller 37 when the sensor detects that a floor latch 40 has been secured to the ledge 36 via a closed latch contact and the ULD 30 is restrained. When the ULD 30 includes ledges 36 on multiple sides, or a single ledge 36 extending along the circumference of the base, the sensors 38 are included on each ledge 36. In some examples the ledges 36 use identical sensor types, in which case the sensors are referred to as being "substantially identical" despite potentially having manufacturing variance and/or minor tolerance related differences.

Figure 2:
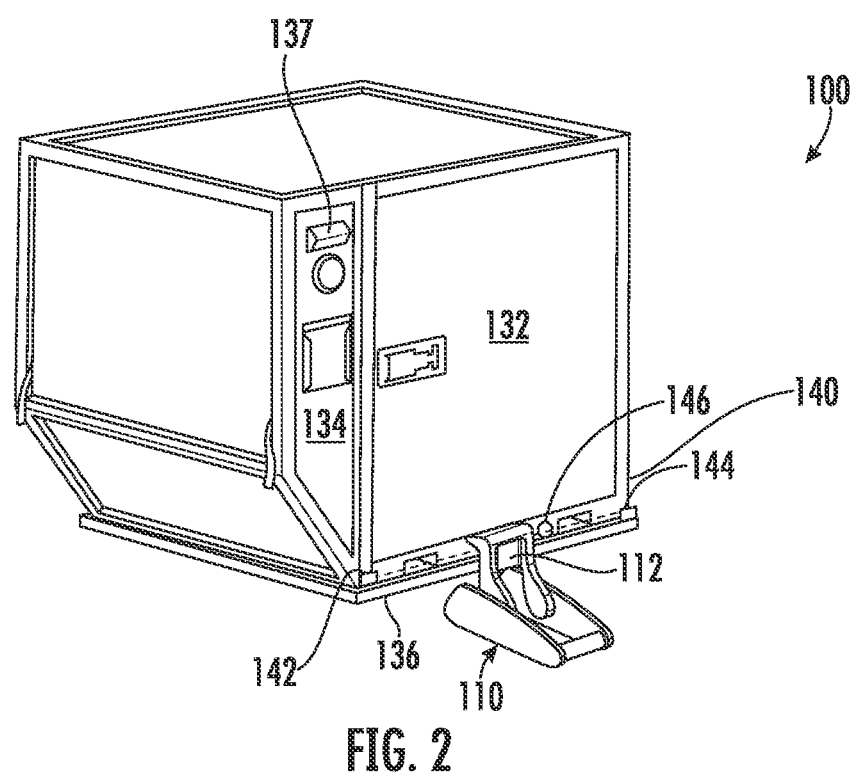
FIG. 2 isometrically illustrates a unit load device being restrained using a floor latch of an aircraft.

With continued reference to FIG. 1, FIG. 2 illustrates an isometric view of an exemplary ULD restrained by a floor latch 110. While not illustrated for explanatory purposes, the floor latch 110 is integrated into, or connected to, the floor of the cargo compartment for the aircraft according to any conventional floor restraint system. The ULD 100 includes the cargo portion 132, and the active portion 134 as described above with reference to FIG. 1. Below the cargo portion 132, at the base of the ULD 100, a ledge 136 protrudes outward. The illustrated ledge 136 is configured to be parallel to the aircraft cargo hold floor when the ULD 30 is loaded in the cargo hold 20. The ledge includes an upward facing surface approximately parallel to the cargo hold floor, and an outward facing surface approximately perpendicular to the floor. It is understood that minor variations can be utilized where the ledge 136 is generally aligned with the cargo hold floor without the surfaces being exactly parallel and perpendicular. As used herein "generally aligned with" includes parallel as well as minor ramps up or down, provided the majority component of the extension is parallel to the aircraft floor. In another example implementation, the ledge 136 can be a portion of a base disposed below the cargo portion 132. In this example, the ledge refers to an outer periphery of the base. The outer periphery can extend beyond the cargo portion 132 or have an identical footprint to the cargo portion 132, when a gap is present between the base and the cargo portion 132.

In the illustrated example of FIG. 2, the ledge 136 extends a full circumference of the base. In alternative examples, the ledge 136 can be limited to a forward and aft edge of the base ULD 100. Further, in some examples, the ledge 136 may extend for only a portion of a given edge of the base, with the portion being sufficiently long enough to interface with the floor latch 110.

Each ledge 136 includes at least one sensor configuration 140. The illustrated sensor configuration 140 of FIG. 2 is an infrared (IR) sensor (which may be referred to as a light sensor) including an emitter 142, and a receiver 144. The emitter 142 emits an infrared beam 146 (which may be referred to as light) that is provided to the receiver 144. When the floor latch 110 closes a latching arm contacts the ledge 136 (referred to as a closed latch contact). The latching arm 112 of the floor latch 110 blocks the beam 146, and the receiver 144 no longer receives the beam 146. When the receiver 144 stops receiving the beam 146, the receiver 144 provides an indication to a controller 137 via any means of communication and the controller 137 determines that the ULD 100 is latched to the floor latch 110 and restrained in place. The controller 137 then may perform corresponding steps (described below with regards to FIG. 6) to respond to the ULD 100 being latched in place. As the floor latch itself is not actively integrated with the control system of the ULD 100, the floor latch 110 is referred to as a passive component.

Figure 3:
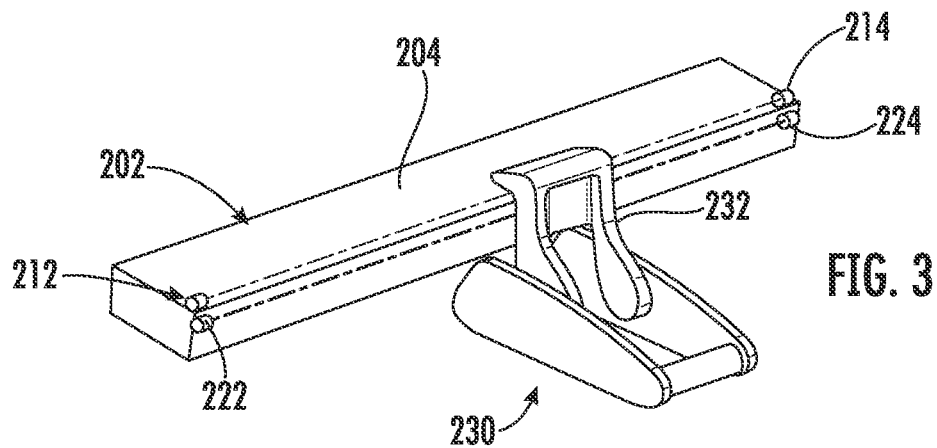
FIG. 3 schematically illustrates a portion of a unit load device including a redundant infrared (IR) restraint detection system.

With continued reference to FIG. 2, FIG. 3 schematically illustrates a modification to the sensor configuration 140 of FIG. 2. The sensor configuration 140 of FIG. 3 includes a first IR emitter 212/receiver 214 pair and a second emitter 222/receiver 224 pair. While described in the instant example as an IR based optical sensor, it is appreciated that alternative optical based sensors, such as lasers, can function in the same capacity and in the same configuration. The general class of optical based sensors including lasers, IR based optical sensors, and the like, are referred to herein as "light sensors". Each pair operates in the same manner as the emitter 142 and receiver 144 of FIG. 2. The first pair 212, 214 is disposed on an upward facing, relative to gravity, surface 204 of the ledge 202. The second pair are disposed on an outward facing surface 206 (facing away from the ULD). When a latching 232 arm of the floor latch 230 makes a full latch contact, the latching arm 232 interferes with both beams, causing both emitter 212, 222/receiver 214, 224 pairs to indicate that the latch is in place. In this example, the controller determines that the latch is fully in place (And thus, the ULD is restrained) once both emitter/receiver pairs report that it is latched. Utilizing the dual beam configuration of FIG. 3 reduces the occurrence of false trips that may occur, for example, due to an object falling on the ledge 202, etc.

Figure 4:
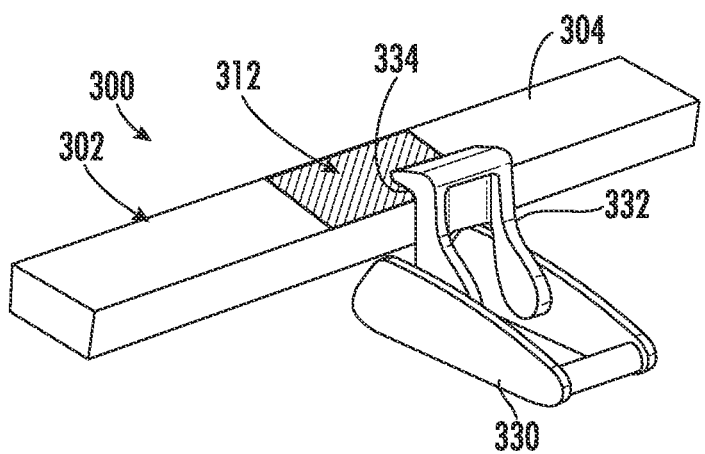
FIG. 4 schematically illustrates a portion of a unit load device including pressure based restraint detection system.
Figure 5:
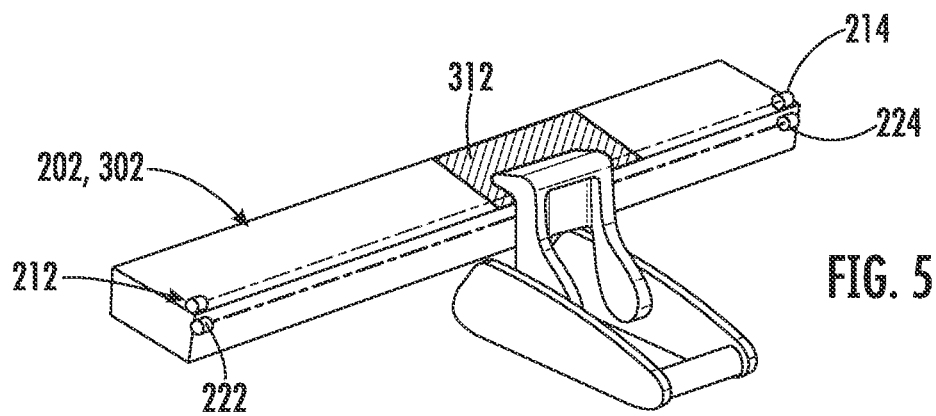
FIG. 5 schematically illustrates a portion of a unit load device including the restraint detection systems of FIGS. 3 and 4 combined.

An alternative sensing system is illustrated in FIG. 4. The alternative sensing system of FIG. 4 omits the beam sensor(s) and utilizes a pressure pad 312 (which may be referred to as a pressure sensor) disposed on the upward facing surface 304 of the ledge 302. The pressure pad 312 may be limited to less than the full length of the ledge 302, but may be sufficiently long that the entirety of a contact portion 334 of the latch arm 332 of the floor latch 330 contacts the pressure pad 312 when the ULD is latched in position. It should be appreciated that in certain instances only a portion of the contact portion 334 of the latch arm 332 of the floor latch 330 may contact the pressure pad 312 when the ULD is latched in position. The pressure pad 312 registers an amount of pressure on the pad 312, and indicates that the ULD is latched in position once the amount of pressure exceeds a predetermined threshold pressure. The predetermined threshold pressure can be selected and controlled according to any know technique and is determined to be an amount of pressure under the expected amount of pressure exerted by the floor latch 330 when the ULD is latched in position but higher than inadvertent pressure that may be exerted, such as pressure from an individual stepping on the sensor pad, etc. As with the previously discussed sensors, the pressure pad 312 is connected to the controller and provides the sensed value to the controller to allow the controller to detect when the ULD is latched in position.

With continued reference to FIGS. 2, 3 and 4, FIG. 5 illustrates a combination of all three sensor configurations within a single embodiment. In this example, the varied sensor configurations are used to verify a "latched in" determination at the controller, with the redundant sensors providing redundant readings. It is understood that while latched, all of the sensors will read that the latch is in position (so long as the sensor(s) remain operational). Because of this understanding, when one sensor configuration indicates that the floor latch 230, 330 is in position and the ULD is latched, while the other sensor configurations do not indicate that the floor latch 230, 330 is latched the controller can determine that at least one sensor is in error (i.e., non-operational, blocked, etc.).

Further, while illustrated and described above within the context of IR beam sensors and pressure sensors, it is appreciated that any other sensor system capable of detecting the latching arm of the floor latching being in position can be utilized to similar effect. By way of example, alternative sensor systems can include other optical sensor types, magnet based sensors, electrical sensors where the latch arm either completes or breaks an electrical circuit, and the like.

Figure 6:
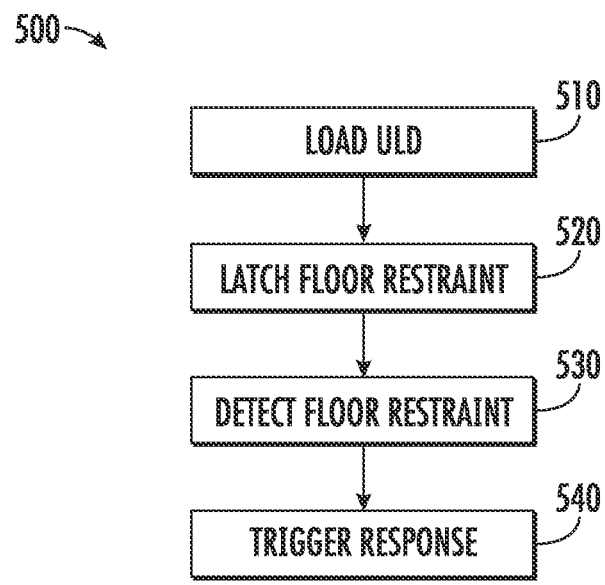
FIG. 6 illustrates a method for verifying a latched state of a unit load device in an aircraft cargo hold.

With reference to all of the above structure, FIG. 6 illustrates a method 500 for operating the system, and responding to a restrained state using a controller disposed on the ULD. Initially the ULD is loaded into a cargo hold, as illustrated in FIG. 1, in a "Load ULD" step 510. Once loaded in the cargo bay, a floor latch restraint is latched to a ledge at the base of the ULD in a "Latch Floor restraint" step 520. Latching the floor restraint includes position a floor latch arm over the ledge which triggers the sensors to detect the position of the floor restraint in a "Detect Floor Restraint" step 530.

When the controller detects that the floor restraint is in position, the controller triggers an automatic response in a "Trigger Response" step 540. The particular response performed may depend on the type of ULD being latched. In some examples, the ULD is a simple cargo container, and the controller responds by connecting to a database using a wireless connection to update the position of the ULD for tracking purpose.

In another example, where the ULD is an active ULD including a refrigeration or heating environmental system, the operations of the ULD (e.g., fan speed, compressor operation, etc.) may be modified once the ULD is latched in position to avoid interference with aircraft operations, to meet regulatory requirements, or because the active environment controls are unnecessary in the cargo hold.

In yet another example, where the ULD includes a telematics module for monitoring cargo or tracking cargo, or when the ULD includes any other data systems or broadcast systems that could potentially interfere with aircraft communications or operations, the controller may respond by disabling the telematics or broadcast operations until the sensors no longer detect the presence of the floor latch, indicating that the ULD is being unloaded from the aircraft.

In each of these examples, the triggered response may be performed by the ULD controller alone, or by the ULD controller in conjunction with an external system (e.g., an airport cargo tracking system, a general aircraft controller, etc.) and may not require active communication with the floor latch system. Further, in each case, the triggered response may be automatically performed by the ULD controller, and may not require intervention by the operators latching the ULD to the floor restraint system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A unit load device (ULD) for aircraft cargo loading, the ULD comprising:
 a container having a cargo portion and a ledge extending from the cargo portion, the ledge being configured to interface with a floor latch of an aircraft;
 a first latch sensor disposed on the ledge, wherein the first latch sensor is configured to detect a closed latch contact when the floor latch closes a latching arm contacts the ledge; and
 a controller electrically connected to the first latch sensor, the controller being configured to automatically perform an action in response to the first latch sensor detecting the closed latch contact.

2. The ULD of claim 1, wherein the ledge comprises an upward facing surface and an outward facing surface, the outward facing surface being perpendicular to the upward facing surface, the first latch sensor being disposed on at least one of the upward facing surface and the outward facing surface.

3. The ULD of claim 2, further comprising a second latch sensor disposed on at least one of the upward facing surface and the outward facing surface, the second latch sensor configured to detect the closed latch contact.

4. The ULD of claim 3, wherein the first latch sensor is disposed on the upward facing surface and the second latch sensor is disposed on the outward facing surface.

5. The ULD of claim 3, wherein the second latch sensor is substantially identical to the first latch sensor.

6. The ULD of claim 1, wherein the first latch sensor comprises a pressure sensor, the pressure sensor indicating the closed latch contact when pressure on the pressure sensor exceeds a threshold pressure value.

7. The ULD of claim 1, wherein the first latch sensor comprises at least one light sensor.

8. The ULD of claim 7, wherein the at least one light sensor comprises at least one emitter and at least one receiver, the at least one emitter configured to emit light toward the at least one receiver, the at least one light sensor indicating the closed latch contact when the at least one receiver does not receive the light emitted by the at least one emitter.

9. The ULD of claim 3, wherein the second latch sensor comprises at least one light sensor.

10. The ULD of claim 9, wherein the at least one light sensor comprises at least one emitter and at least one receiver, the at least one emitter configured to emit light toward the at least one receiver, the at least one light sensor indicating the closed latch contact when the at least one receiver does not receive the light emitted by the at least one emitter.

11. The ULD of claim 1, wherein the action in response to the first latch sensor detecting the closed latch contact is at least one of: disabling a telematics system, and altering a heating, ventilation, and cooling cycle of an active cooling system of the ULD.

12. A method for verifying a latched state of a unit load device (ULD) in an aircraft cargo hold, the method comprising:
 detecting a latching arm of a floor latch of the aircraft cargo hold interfacing with a ledge of the ULD when the floor latch closes a latching arm contacts the ledge using at least one sensor disposed on the ledge; wherein the ULD comprises a container having a cargo portion and the ledge extending from the cargo portion; and
 a controller of the ULD, electrically connected to the at least one sensor, responding to detecting of the latching arm interfacing with the ledge by at least one of: disabling a telematics system, and altering a heating, ventilation, and cooling cycle of an active cooling system of the ULD.

13. The method of claim 12, wherein the at least one sensor comprises at least one light sensor.

14. The method of claim 13, wherein the at least one light sensor comprises at least one emitter and at least one receiver, the at least one emitter configured to emit light toward the at least one receiver, the detecting of the latching arm interfacing with the ledge is completed by detecting that the at least one receiver is not receiving the light emitted by the at least one emitter.

15. The method of claim 12, wherein the at least one sensor comprises a pressure sensor.

16. The method of claim 15, wherein the detecting of the latching arm of the floor latch interfacing with the ledge of the ULD when the floor latch closes the latching arm contacts the ledge is detected when pressure on the pressure sensor exceeds a threshold pressure value, the pressure being generated at least in part by the latching arm.

17. The method of claim 12, wherein detecting the latching arm interfacing with the ledge is verified by a second sensor disposed on the ledge.

18. The method of claim 17, wherein the second sensor comprises at least one of a pressure sensor and a light sensor.

19. The method of claim 13, further comprising initiating a cargo tracking system of the ULD to communicate with a central cargo tracking system to update a tracking status of the ULD.

* * * * *